(12) United States Patent  
Ayyagari et al.

(10) Patent No.: US 9,158,645 B2  
(45) Date of Patent: Oct. 13, 2015

(54) CONTINUOUSLY TRANSFERRING DATA USING A USB MASS STORAGE DEVICE

(71) Applicant: International Business Machines Corporation, Armonk, NY (US)

(72) Inventors: Phani K. Ayyagari, Hyderabad (IN); Purnachandra R. Jasti, Hyderabad (IN); Sudhir Maddali, Hyderabad (IN); Madhusudana R. Thanugundala, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/108,451

(22) Filed: Dec. 17, 2013

(65) Prior Publication Data  
US 2014/0304435 A1  Oct. 9, 2014

Related U.S. Application Data

(63) Continuation of application No. 13/858,143, filed on Apr. 8, 2013.

(51) Int. Cl.  
  *G06F 3/00* (2006.01)  
  *G06F 11/30* (2006.01)
(52) U.S. Cl.  
  CPC .................................. *G06F 11/3055* (2013.01)
(58) Field of Classification Search  
  None  
  See application file for complete search history.

(56) References Cited

U.S. PATENT DOCUMENTS

| | | | |
|---|---|---|---|
| 7,533,209 B2 | 5/2009 | Croyle | |
| 7,707,327 B2* | 4/2010 | Namba | 710/32 |
| 2008/0082767 A1* | 4/2008 | Nulkar et al. | 711/156 |
| 2008/0130532 A1* | 6/2008 | Maenpaa | 370/310 |
| 2009/0287856 A1* | 11/2009 | Ito | 710/19 |
| 2010/0042753 A1 | 2/2010 | Whaley et al. | |
| 2010/0157882 A1* | 6/2010 | Moriwaki et al. | 370/328 |
| 2012/0203938 A1 | 8/2012 | Nakajima | |

FOREIGN PATENT DOCUMENTS

| | | | |
|---|---|---|---|
| CA | 2776340 A1 | 5/2011 | |
| GB | 2459400 A | 10/2009 | |

OTHER PUBLICATIONS

Pending application IN920120194US1, U.S. Appl. No. 13/858,143, filed Apr. 8, 2013, "Continuously Tranferring Data Using a USB Mass Storage Device".

* cited by examiner

*Primary Examiner* — Elias Mamo  
(74) *Attorney, Agent, or Firm* — Teddi Maranzano

(57) ABSTRACT

A method for continuous data transfer when a USB mass storage device is disconnected and reconnected is provided. The method may include monitoring state information from one or more mass storage devices, using a software driver to detect a change in state of the mass storage device on the computer. Active I/O transfers using the USB mass storage device are paused when the software driver detects that the USB mass storage device is detached from the computer. A configurable timer is started. The software drive may detect the attaching of a USB device. If, prior to the expiration of the timer, the software driver verifies that the USB mass storage device is the same that was previously attached to the computer, active I/O transfers are continued.

7 Claims, 5 Drawing Sheets

200

| Field | Offset | Description |
|---|---|---|
| blength | 0 | Size of device descriptor in bytes |
| bDescriptorType | 1 | Device Descriptor Type |
| bcdUSB | 2 | USB Release number |
| bdeviceClass | 4 | Class Code |
| bdeviceSubclass | 5 | Subclass code |
| bdeviceProtocol | 6 | Protocol Code |
| bMaxPacketSize0 | 7 | Max packet size for endpoint zero |
| idVendor | 8 | Vendor Id |
| idProduct | 10 | Product ID |
| bcdDevice | 12 | Device Release number |
| iManufacturer | 14 | Manufacturer String |
| iProduct | 15 | Index of string descriptor describing product |
| iSerialNumber | 16 | Device Serial Number |
| bNumconfigurations | 17 | Possible Configurations |

210 → idVendor
220 → idProduct / bcdDevice
230 → bNumconfigurations

250

| Field | Offset | Description |
|---|---|---|
| bLength | 0 | Size of Vendor Specific Descriptor in Bytes |
| bDescriptorType | 1 | Vendor Specific Descriptor |
| bUniqueDevid | 2 | Unique Device Identifier Defined by Vendor |

CONTINUOUSLY TRANSFERRING DATA USING A USB MASS STORAGE DEVICE

CROSS REFERENCE

The present application is a continuation of and claims priority under 35 U.S.C. §120 of U.S. patent application Ser. No. 13/858,143, filed on Apr. 8, 2013, which is incorporated by reference in its entirety.

FIELD

The present invention relates generally to the field of peripheral devices of a computer system, and more particularly relates to computer systems adaptable for coupling to Universal Serial Bus (USB) mass storage devices.

BACKGROUND

USB is an industry standard that was designed to standardize connecting computer peripherals, such as printers, keyboards, and mass storage devices, to a computer. Because of their convenience and ease of use, USB devices may be used to facilitate transporting data from one computer to another without needing the support of a communications network, and without the devices requiring extensive technical configuration. A USB device, in general, may be accessed simply by plugging the USB device into a USB port on a computer. Despite the convenience, however, a USB device has disadvantages that may cause it to spontaneously disconnect and reconnect at the computer. For example, this may occur when a voltage fluctuation is detected at the host controller port, or if power to the USB hub containing the USB device is momentarily lost. Additionally, a computer user may accidentally remove a USB device, for example, a USB mass storage device such as a disk drive, from the computer without properly quiescing any active data transfer operations. In these examples, active Input/Output (I/O) operations will be interrupted when the USB device is disconnected. Even if the USB device is reconnected within a few milliseconds, the outstanding I/Os will be discarded and a permanent failure will be returned to the executing program, which then must logically reopen the USB device and restart the data transfer. An application accessing the data may function incorrectly as a result of data that may have become corrupted. The consequences of improperly removing a USB device may be especially harmful with USB mass storage devices, since these devices may frequently be used to install operating system software or other critical firmware components on computer hardware. Data that was being transferred at the time of the interruption may potentially corrupt the critical computer system software, requiring extensive remediation.

It may therefore be desirable, among other things, to provide a more efficient method of transparently continuing USB device operations despite, for example, transient disconnecting and reconnecting of the USB device.

BRIEF SUMMARY

According to an aspect of the invention, a method for transferring data using a USB device comprises: receiving a first state change notification from a first USB device indicating that the first USB device is detached from a computer; storing active I/O requests corresponding to the first USB device in a queue for the duration of a predetermined time interval; receiving a second state change notification from a second USB device indicating that the second USB device is attached to the computer; verifying the attached second USB device as corresponding to the detached first USB device associated with the active I/O requests; and resuming data transfer corresponding to the active I/O requests based on the attached second USB device being verified as the detached first USB device, wherein the data transfer is resumed during the predetermined time interval.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is a table illustrating the fields of a USB descriptor according to the USB standard;

DETAILED DESCRIPTION

Embodiments of the present invention will now be described with reference to the figures. As used herein, the term "operating system" may refer to a set of supervisory routines for controlling the operating of a computing system, including one or more of the following major functions: task management, storage management, input/output management, and data management. An "application program," as used herein, may refer to a program written to do a user's work, usually in a high-level language, and is loaded into main storage and executed under the supervision of the operating system's task manager. In general, a USB device is one that implements the USB industry standard. Additionally, the USB device connects to a computer that is properly configured with one or more physical USB interfaces and associated logical components that, together, enable an application program to communicate with the USB device. The principal physical components referred to herein include: the physical USB device attachment point, referred to as a "port"; and the computer's interface to the USB, referred to as a "host controller." The USB attachment to the host controller, which may be referred to as a "hub," may be integrated into the host controller hardware (i.e., root hub), or be external (i.e., intermediate hub). A logical component which abstracts a physical component may be referred to as a "device driver." Thus, a USB protocol driver may represent a logical abstraction of a USB device in the logical layer. USB devices are divided into classes, such as hub, human interface, printer, imaging, and mass storage device. In an embodiment of the present invention, "USB device" may refer to any class of USB device including, but not limited to, a mass storage class of USB device that supports bi-directional file transfer between the USB device and a host computer, such as an optical device; a flash drive; a tape drive; a smartphone; a media player; a camera; or an external disk drive. Embodiments of the present invention apply to computers and operating systems configured to support USB devices, i.e., USB mass storage devices, although implementation details may vary according to the hardware platform and operating system. For example, one or more hubs, ports, and host controllers may be embodied on a card, such as a Peripheral Component Interconnect (PCI) card or a Peripheral Component Interconnect eXtended (PCI-X) card, which is directly attached to a computer system bus. Similarly, embodiments of the present invention may be implemented using the Linux®, AIX® or Windows® operating systems in combination with computer hardware configured to support the respective operating system. However, the following exemplary embodiments may refer to a USB device of the mass storage class in combination with, for example, the IBM AIX® operating system configured on IBM POWER® servers.

Figure 3:
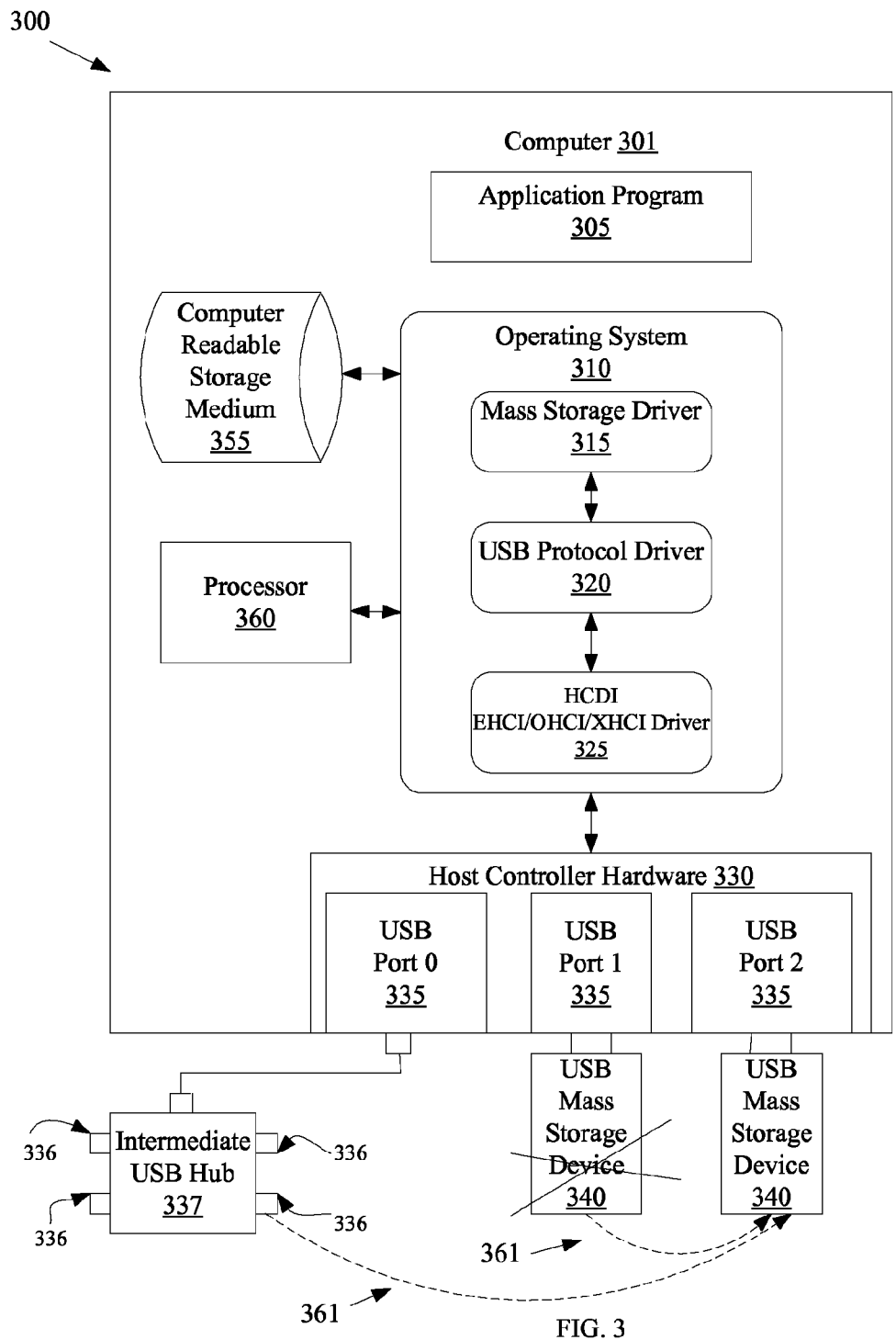
FIG. 3 is a schematic block diagram of a computer system according to FIGS. 1A-1B.

Referring to FIGS. 1 and 3, a system 300 and method 100 according to an embodiment of the invention provides continuous data transfer using a USB device such as, for example, a USB mass storage device 340. In FIG. 3, the system 300 includes a USB protocol driver 320 incorporating the steps of the method 100. The USB protocol driver 320 may be stored on a computer readable storage device 355 of a computer 301, which includes a processor 360 for executing the steps of a program, i.e., the USB protocol driver 320. The USB protocol driver 320 executes on the computer 301 and may be supplied with the operating system 310 to implement the USB protocol for the device. At the logical layer, a USB host controller driver interface (HCDI) 325 provides a logical interface between the USB host controller driver (not shown) and the USB protocol driver 320. A computer 301 may provide one or more host controller implementations that each may require a particular HCDI 325 depending, for example, on the host controller hardware 330 and the version of the USB standard. In an embodiment of the present invention, where a PCI or PCI-X card provides the USB hardware, the HCDI 325 may be an implementation of the Open Host Controller Interface (OHCI) open standard, the Enhanced Host Controller Interface (EHCI) standard, or the eXtensible Host Controller Interface (XHCI) standard in combination with a USB device of the mass storage class, and the IBM AIX® operating system configured on IBM POWER® servers. However, both types of HCDI 325 may be present on the same computer 301, where, for example, one or more USB devices implement different versions of the USB standard.

Figure 1A:
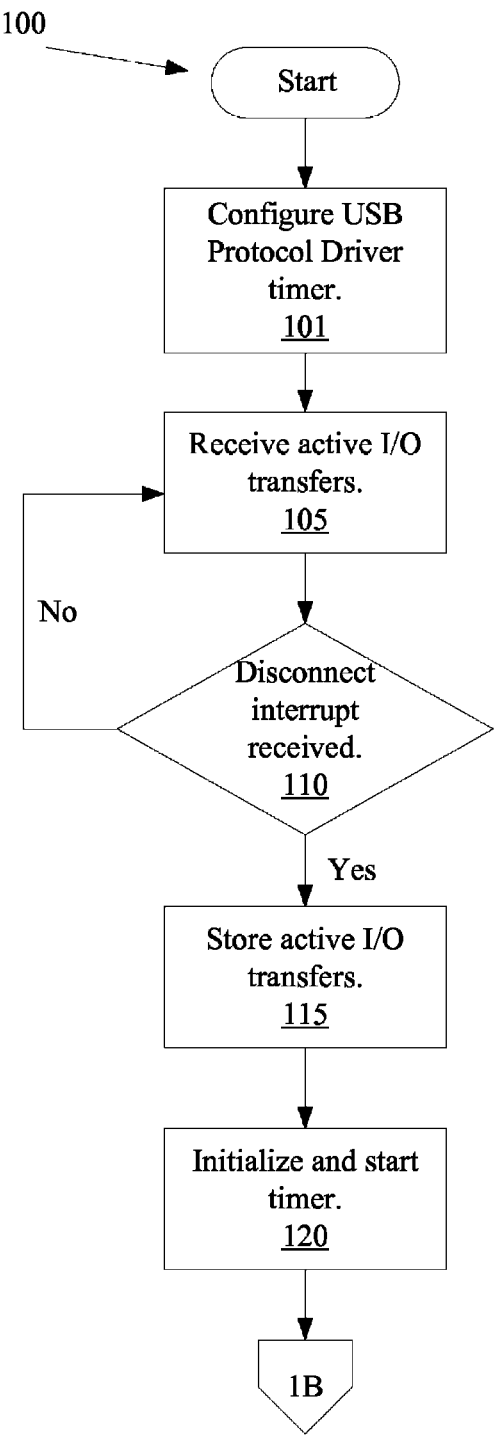
FIGS. 1A-1B is a flow chart illustrating an overview of an embodiment of a method according to the present invention.

Referring to FIG. 1A, 101 represents the start of the method 100. At 101, the USB mass storage device 340 is configured for use by the computer 301 using the USB protocol driver 320 and the mass storage driver 315. The configuration process may vary according to the computer architecture and operating system. Host software may complement and extend the USB standard with additional features and customization methods. For example, in an embodiment of the present invention, a user may configure the default time out value in the USB protocol driver 320 to a value more suitable to the hardware and application characteristics.

At 105 of FIG. 1A, following configuration and initialization of the USB mass storage device 340, the application program 305 may initiate a series of data transfers with the USB mass storage device 340 configured on a USB port such as USB port 1 (335). Alternatively, in an embodiment of the present invention, a USB mass storage device 340 may be connected to a port 336 on an intermediate USB hub 337 that is, in turn, connected to a USB port, such as USB port 0 335.

At 110, the USB protocol driver 320 may receive an interrupt indicating that the USB mass storage device 340 on USB port 1 (335) has been disconnected from the computer 301 during the active data transfers. In one instance, a user may have accidentally removed the device, perhaps immediately reconnecting it upon realizing the mistake. Or, for example, there may have been a voltage fluctuation that is beyond the tolerances of the device. In both cases, the active data transfers stop unexpectedly. However, in the second case, a resulting abnormal termination of the application program 305 may not be noticed until some time later, complicating diagnostic efforts.

However, at 115, according to one embodiment, the data transfers for USB mass storage device 340 on USB port 1 (335) are held in a pending I/O queue (not shown) for the duration of the timer interval value, or until the USB protocol driver 320 receives an interrupt indicating that a USB mass storage device 340 has been connected to one of the USB ports. The pending I/O queue structure and location may vary according to the operating system and hardware platform. In one embodiment, the pending I/O queue may be a data structure formed as a linked list, an array, or any other data structure suitable for use as a queue, and stored in operating system memory and configured such that a processor may process each I/O request. For example, as embodied in the AIX® operating system, both an active I/O queue (not shown) and a pending I/O queue are maintained for each device. Upon receiving an interrupt indicating that the USB mass storage device 340 has been disconnected, the USB protocol driver 320 stops moving the data transfer requests from the active I/O queue to the USB device 340, but continues to accept them on the pending I/O queue. Thus, both the data transfers and the application program 305 processing continue uninterrupted. If no disconnect interrupt is received (115), active I/O transfers are continuously received (105).

At 120, the timer is started using either the default value of three seconds, or the value manually configured by the user previously at 101 (FIG. 1A). If the USB mass storage device 340 is disconnected due to a machine triggered event associated with, for example, a voltage fluctuation at a host USB port such as USB port 1 (335), reconnection will be recognized on the same port (i.e., port 1 (335)), and may likely be in the order of milliseconds. However, where the USB mass storage device 340 is reconnected to a different USB port, for example USB port 2 335, after a manually triggered operation, such as the user accidentally removing the device, the reconnection time may likely be seconds. The user may consider the hardware environment, along with the impact to a running application, in determining an appropriate timer value, and calculating an adequate size for a pending I/O queue. Thus, based on the foregoing example, a timer value of a few seconds would be a suitable timer setting for a voltage fluctuation of a few milliseconds.

Figure 1B:
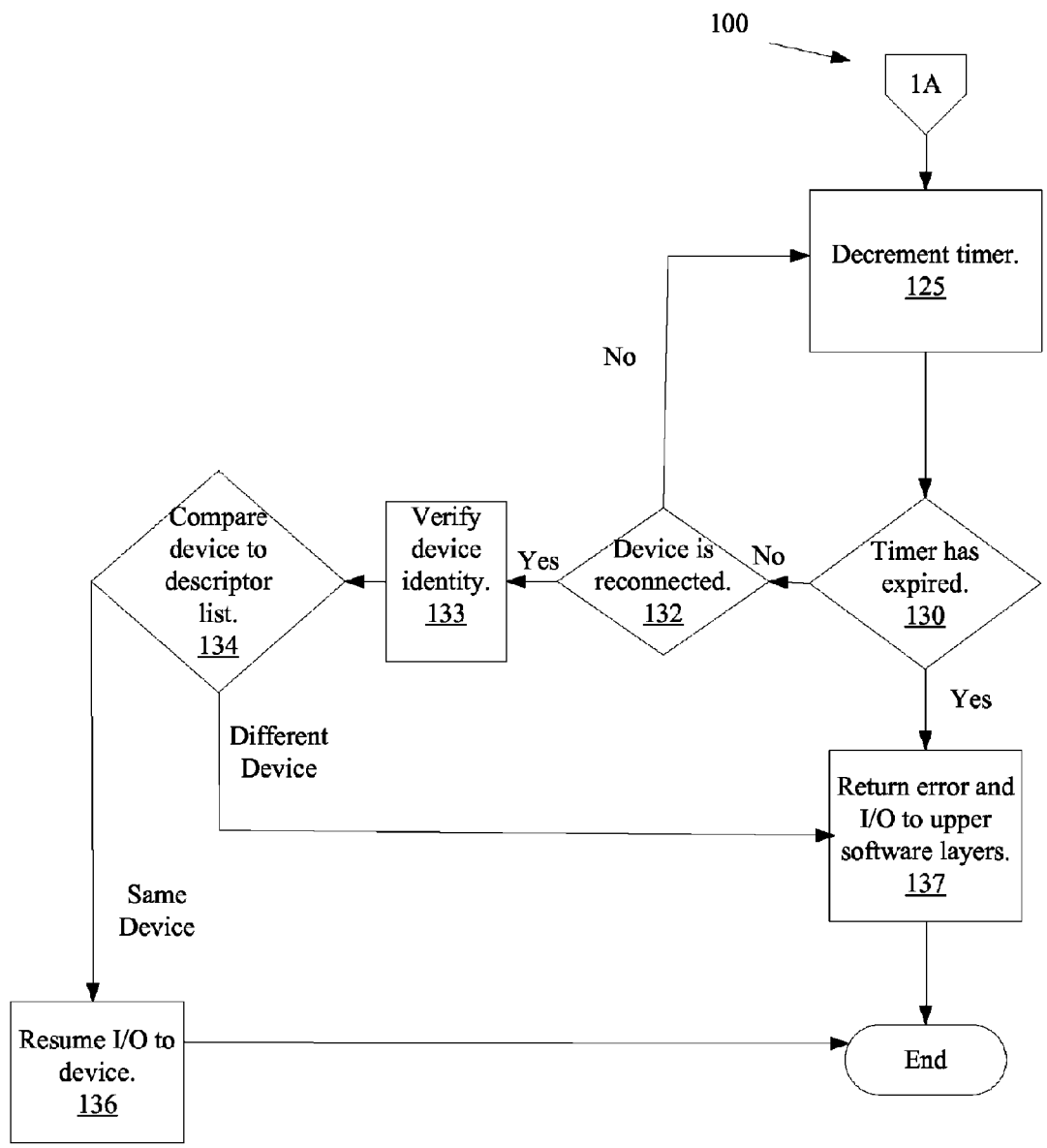

At 125 of FIG. 1B, as the configured timer begins decrementing, the USB protocol driver 320 enables for a device interrupt that indicates that a USB device has been connected to the computer 301 on any of the USB ports. If at 130, the predetermined time interval elapses without any USB device being connected to the computer 301, the USB protocol driver 320 stops servicing the pending I/O queue for the previously disconnected USB mass storage device 340. Thus, at 137, data transfer requests in the pending I/O queue are returned to the upper physical hardware and logical software layers with an error, for example ENODEV, eventually disrupting processing in the application program 305.

If, at 132, a USB device attachment is detected prior to the predetermined time interval elapsing (130), the USB protocol driver 320 verifies the identity of the discovered USB device at 133 (FIG. 1B). A USB device that implements the USB standard is internally branded with information for self-identification and generic configuration. During enumeration, when a USB device is first attached to the computer 301, a USB device reports its identifying attributes to the host computer 301 using one or more data structures, each referred to as a descriptor 200 (FIG. 2). The USB standard provides the GET_DESCRIPTOR device request that may be configured with a parameter list to extract the USB device's self-identifying descriptor 200 from the USB device. The data returned by the GET_DESCRIPTOR device request includes fields that uniquely identify the attached USB device, such as: idVendor 210: idProduct 220; and iSerialNumber 230. In another embodiment, if the method to identify the USB device uniquely fails because of incorrect values of idVendor 210, idProduct 220, and/or iSerialNumber 230, the host software may instead configure a GET_DESCRIPTOR request to read a vendor-specific page from the USB device, where the USB device vendor provides one. For example, where 250 represents an exemplary vendor-specific descriptor, 255 represents a unique vendor-defined device identifier, bUniqueDevid, which may be input to a GET_DESCRIPTOR request.

A list of device descriptors 200 (FIG. 2) representing the USB devices managed by the USB protocol driver 320 (FIG. 3) may be maintained within the USB protocol driver 320 and may be accessed using standard programming algorithms. At 134, the USB protocol driver 320 searches its internal list of USB device descriptors 200 for one matching the idVendor 210, idProduct 220, and iSerialNumber 230 previously returned by the GET_DESCRIPTOR device request initiated upon, for example, USB device attachment. Where no matching device descriptor 200 is found, the USB protocol driver 320 stops servicing the pending I/O queue. This scenario may, for example, apply to the attachment of a new USB device. The process may then return to 137, whereby data transfer requests in the pending I/O queue are returned to the upper physical hardware and logical software layers with an error, for example ENODEV. Having determined that the interrupt is from a different USB device, the USB protocol driver 320 then performs a full enumeration/configuration process on the newly attached USB device.

Figure 4:
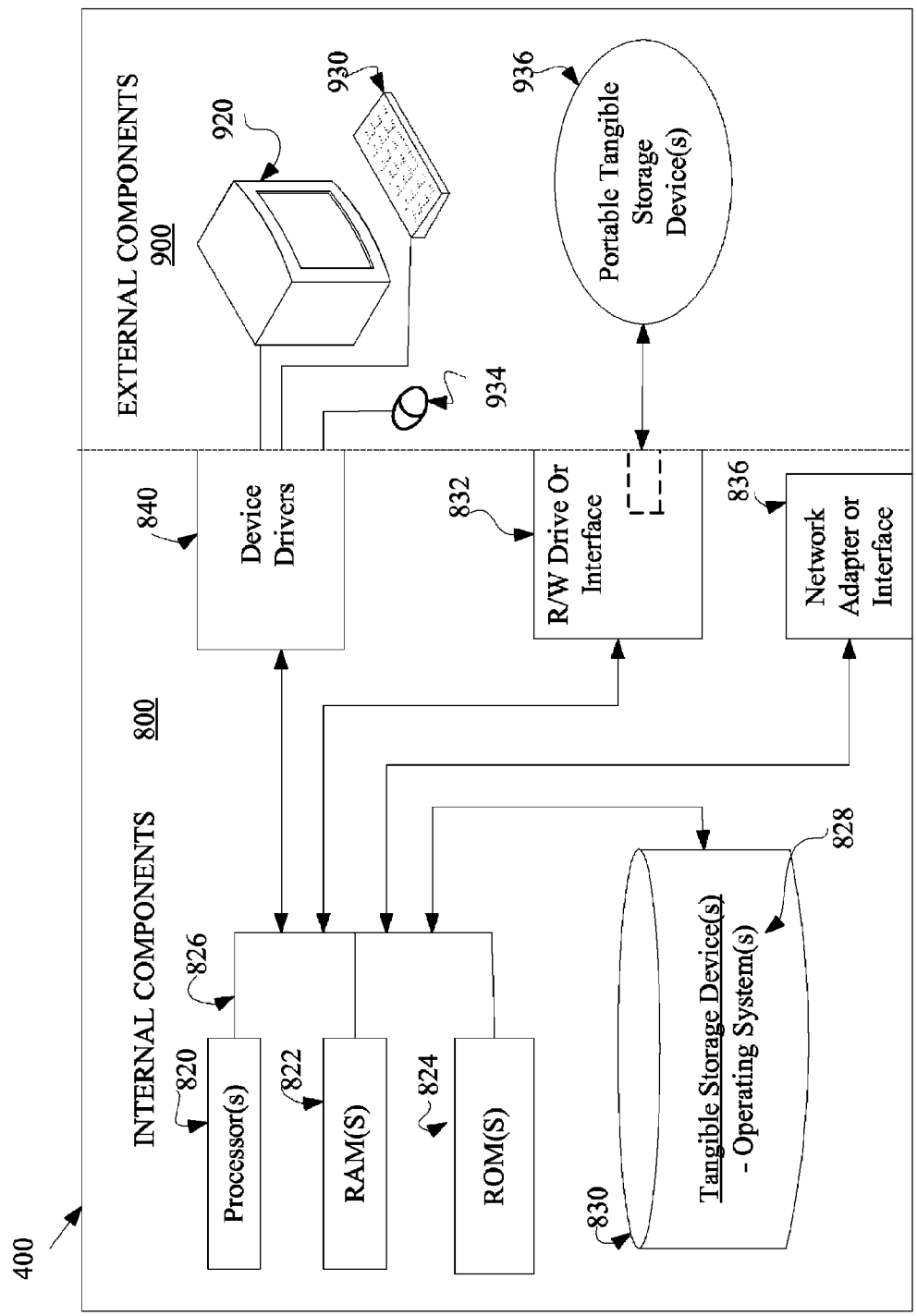
FIG. 4 is a block diagram of hardware and software within the computer of FIG. 3 in accordance with an embodiment of the present invention.

However, if at 136, a match is found, the USB protocol driver 320 recognizes that the newly attached device is, in fact, the USB mass storage device 340 that was previously removed. The data transfers that are held on the pending I/O queue are re-directed to the active I/O queue for the USB mass storage device 340. Data transfer is then subsequently resumed from the active I/O queue. The USB mass storage device 340 was previously configured. However, the port number initiating the current interrupt identifies the USB port to which the USB mass storage device 340 is now connected and to which the pending I/O queue is directed. Therefore, as shown in 361 of FIG. 3, the USB mass storage device 340 may successfully be reattached to a port different from the port it originally occupied. As previously indicated, the prior configuration data remains intact. Similarly, a USB mass storage device 340 that was previously attached to a port 336 on an intermediate hub 337 is not limited to reconnection only at the intermediate hub 337. As shown in 361, a USB mass storage device 340 may be reconnected to any available USB port FIG. 4 shows a block diagram of the components of a data processing system 800, 900, such as a computing device 300 (FIG. 3) in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing device 301 (FIG. 3) may include respective sets of internal component 800 and external components 900 illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 305, 310, 315, 320, and 325 (FIG. 3) in respective computing device 301 (FIG. 3) is stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The driver programs 310, 315, 320, and 325 (FIG. 3), operating system 310 (FIG. 3), and application program 305 (FIG. 3) that are associated with computing devices 301, 330, 335, 337, and 340 (FIG. 3) can be stored on one or more of the respective portable computer-readable tangible storage devices 936, read via the respective R/W drive or interface 832 and loaded into the respective hard drive 830.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The driver programs 310, 315, 320, and 325 (FIG. 3), operating system 310 (FIG. 3), and application program 305 (FIG. 3) that are associated with computing device 301 (FIG. 3), can be downloaded to computing device 301 (FIG. 3) from an external computer (e.g., server) via a network (for example, the Internet, a local area network or other, wide area network) and respective network adapters or interfaces 836. From the network adapters (or switch port adaptors) or interfaces 836, the driver programs 310, 315, 320, and 325 (FIG. 3), operating system 310 (FIG. 3), and application program 305 (FIG. 3) associated with computing device 301 (FIG. 3) are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method for continuously transferring data using a Universal Serial Bus (USB) device, comprising:
  receiving a first state change notification from a first USB device indicating that the first USB device is detached from a computer;

holding active I/O requests directed to the detached first USB device in a pending I/O queue, wherein the holding is continuous for a predetermined time interval and both an application program and the active I/O requests continue uninterrupted for the predetermined time interval;

receiving a second state change notification from a second USB device indicating that the second USB device is attached to the computer;

verifying the attached second USB device as corresponding to the detached first USB device associated with the active I/O requests;

resuming data transfer to the attached second USB device from the pending I/O queue, wherein the attached second USB device is verified as the detached first USB device, and the data transfer is resumed during the predetermined time interval; and returning data transfer requests in the pending I/O queue to the application program with an error indication when the attached second USB device is not verified as the detached first USB device.

2. The method of claim 1, wherein the first USB device and the second USB device comprise a USB mass storage class device.

3. The method of claim 1, wherein the first state change notification comprises a first interrupt, and the second state change notification comprises a second interrupt.

4. The method of claim 1, further comprising:
activating a timer having a time value; and
comparing the time value with the predetermined time interval, using the plurality of program instructions on the computer having the processor for executing the plurality of program instructions.

5. The method of claim 1, wherein the predetermined time interval is user-configurable.

6. The method of claim 1, wherein verifying the attached second USB device further comprises:
extracting a device descriptor page from the second USB device;
searching a list of device descriptor pages in a protocol driver storage for a device descriptor page matching the extracted device descriptor page;
identifying the attached second USB device as the detached first USB device when the extracted device descriptor page matches the device descriptor page from the protocol driver storage; and
identifying the attached second USB device as a new USB device when the extracted device descriptor page does not match the device descriptor page from the protocol driver storage.

7. The method of claim 6, wherein the extracted device descriptor page and the device descriptor page from the protocol driver storage include: a product identifier; a vendor identifier; and a serial number.

* * * * *